United States Patent

[11] 3,588,814

| [72] | Inventor | Thad E. Furlong<br>2660 Greenway Drive, Salem, Oreg. 97310 |
|---|---|---|
| [21] | Appl. No. | 712,140 |
| [22] | Filed | Mar. 11, 1968 |
| [45] | Patented | June 28, 1971 |

[54] ELECTRIC TIRE INFLATION INDICATOR
4 Claims, 9 Drawing Figs.

[52] U.S. Cl. .................................... 340/58,
73/146.5
[51] Int. Cl. ..................................... B60c 23/06
[50] Field of Search ........................... 340/58, 27,
262; 73/146.5

[56] References Cited
UNITED STATES PATENTS

| 2,057,556 | 10/1936 | Cole .............................. | 340/58 |
| 2,629,086 | 2/1953 | Ainsworth et al. ............ | 340/58 |
| 3,093,812 | 6/1963 | Brown .......................... | 340/58 |
| 3,192,503 | 6/1965 | Lang ............................. | 340/27 |

*Primary Examiner*—Alvin H. Waring
*Attorney*—James D. Givnan

ABSTRACT: Means for and method of converting the rotational travel speed of the wheels of a vehicle into signals whose value will be proportional to the variable speed of rotation of the wheels in accordance with the inflated condition of their respective pneumatic tires.

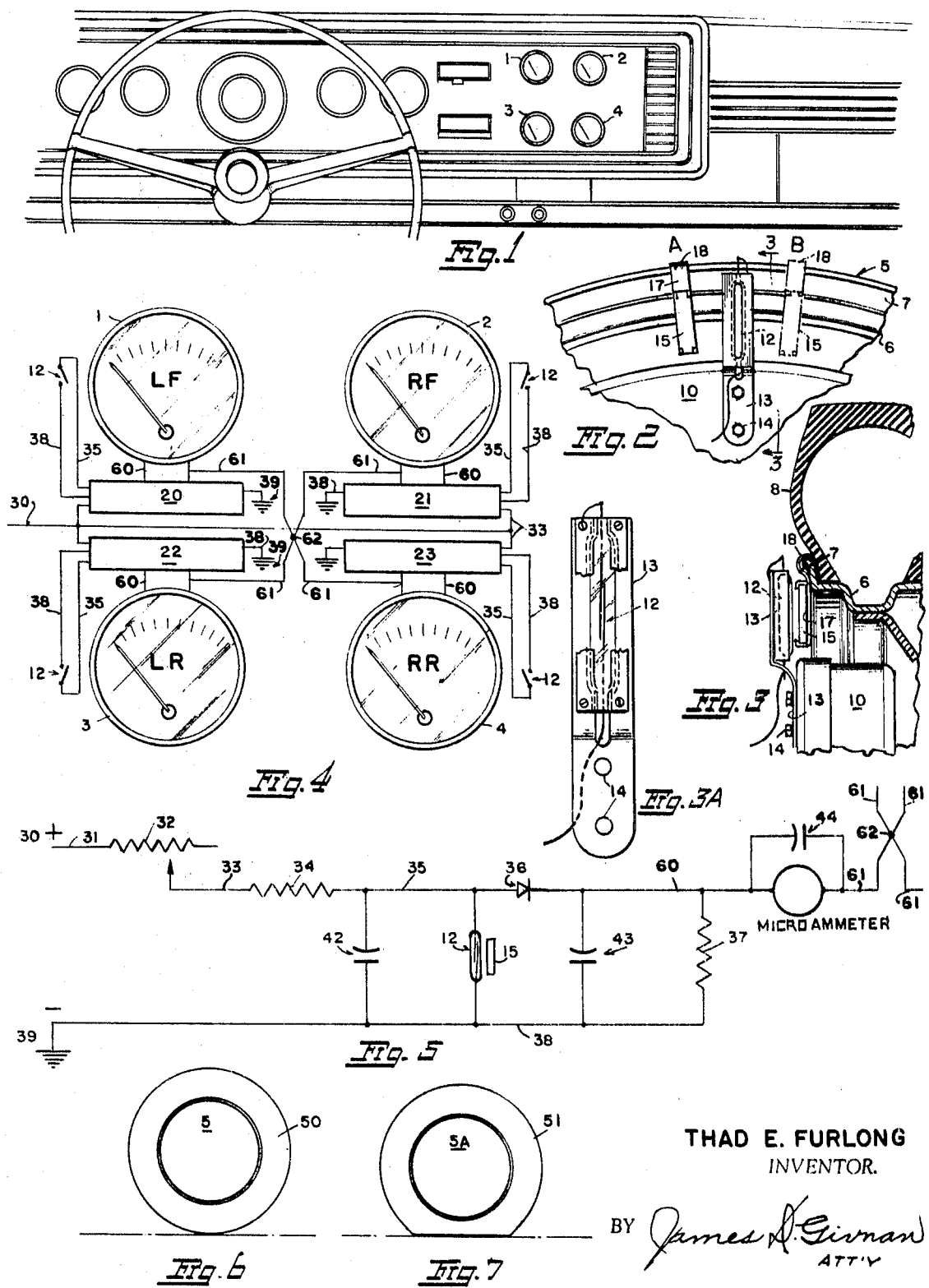
THAD E. FURLONG
INVENTOR.

A TIME INTERVAL PER REVOLUTION OF FULLY INFLATED TIRE AND WHEEL 5 OF FIG. 6.

B TIME INTERVAL PER REVOLUTION OF UNDERINFLATED TIRE AND WHEEL 5A OF FIG. 7.

C DIFFERENCE IN PEAK VOLTAGES ATTAINED ACROSS CAPACITOR 42 (FIG.5) OF A FULLY INFLATED TIRE (FIG.6) AND OF AN UNDERINFLATED TIRE AS IN FIG.7.

VOLTAGE ACROSS CAPACITOR 42

THAD E. FURLONG
INVENTOR.

BY James D. Givnan
ATT'Y 3,588,814

ELECTRIC TIRE INFLATION INDICATOR

This invention relates to a system for warning the operator of a vehicle at any travelling speed of any under-inflated condition of the vehicle tires.

The object of the invention is to provide an electronic system including visual signals operated by a magnetically actuated switch associated with each vehicle wheel to indicate by means of microammeters, lights or any suitable electrically energized audible or visual signals, which tire is under-inflated and needs attention. The circuitry includes a source of electrical energy or battery connected in circuit with the switches and related components for independent operation according to the pressure in each tire independently and selectively controlled.

The circuitry is grounded to the frame of the vehicle and operative in connection with single or dual wheels and tires.

The invention is of simple construction involving a minimum number of parts which can be easily installed and serviced while requiring little servicing once installed for use.

The foregoing and other objects and advantages which will become subsequently apparent reside in the details of construction and operation as more fully hereinafter described and claimed, reference being had to the accompanying drawings forming a part hereof and in which:

FIG. 1 illustrates fragmentarily the conventional dashboard of an automotive vehicle showing the grouping thereon of microammeters incorporated in the invention and identified with the left and right front and rear wheels of the vehicle.

FIG. 2 is a fragmentary side elevational view on an enlarged scale of a typical automotive wheel and brake drum assembly with switch components mounted thereon in accordance with this invention.

FIG. 3 is a sectional elevational view taken approximately along the line 3—3 of FIG. 2 including a similar view of a pneumatic tire mounted on the vehicle wheel in the conventional manner.

FIG. 3A is an elevational detail view on a larger scale of a typical magnetic reed switch with a fragment of its protective covering broken away.

FIG. 4 is a front elevational view of the group of microammeters referred to in the description of FIG. 1 and illustrating diagrammatically the typical electric circuitry to each of the microammeters.

FIG. 5 is a typical wiring diagram.

FIGS. 6 and 7 are diagrammatic elevational views of two wheels on the same vehicle with the tire of FIG. 6 shown fully or properly inflated and that of FIG. 7 partially deflated.

Figure 5A:
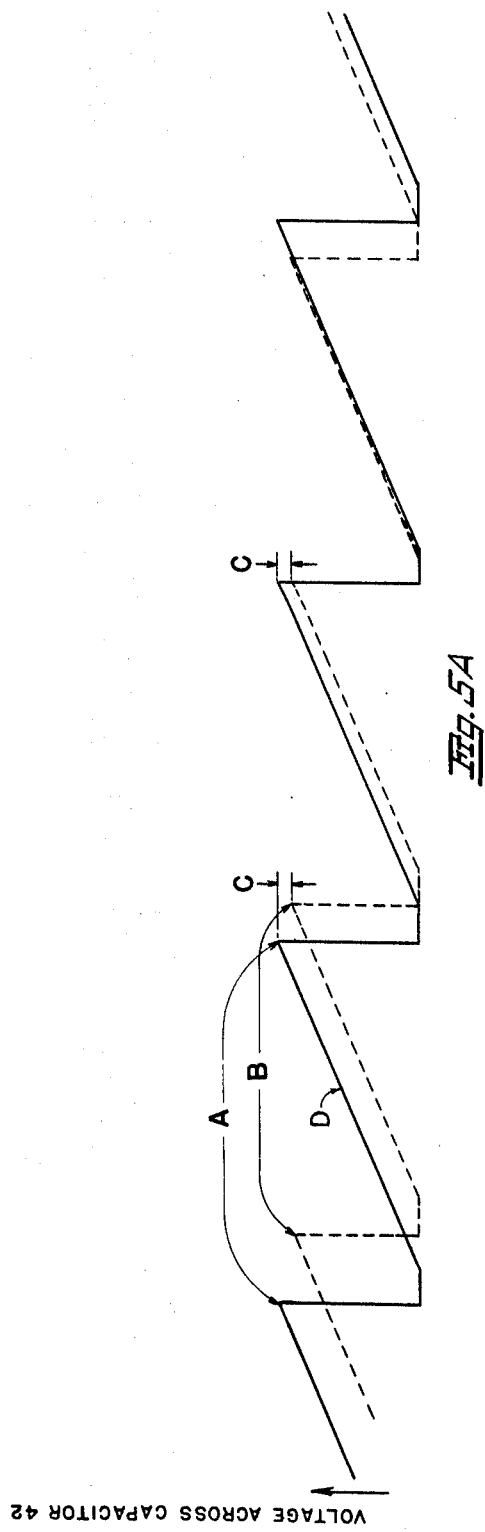
FIG. 5A is a sawtooth pattern illustrating and describing voltage variations resulting from rotational wheel speed variations as above pointed out.

With continuing reference to the drawings wherein like reference numerals and characters designate like parts, reference numerals 1, 2, 3 and 4 indicate the microammeters above referred to and indentified respectively, as shown in FIG. 4, with the left and right front wheels and the left and right rear wheels of the vehicle.

In the fragmentary assembly shown in FIGS. 2 and 3, the typical wheel indicated generally at 5 includes the usual rim 6, retaining flanges 7 for the tire 8 (FIG. 3) and provided with the usual housing 10 for the wheel braking mechanism, not shown.

The switching unit shown in FIGS. 2—3A comprises a normally open magnetic read switch indicated generally at 12 mounted to and insulated in any suitable manner from a stationary supporting bracket 13 secured as at 14 to the nonrotatable brake housing 10 or, if desired or necessary in certain types of vehicles, to any other adjacent stationary part of the vehicle.

Rotatable with the wheel relative to the fixed brake drum housing 10 is a permanent magnet 15 carried by a dielectric bracket 17 secured by a clip 18 to the wheel flange 7 and held against circumferential displacement by lateral pressure of the sidewall or beading of the tire, as shown.

From the foregoing it will be readily apparent that the flexible electrodes of magnetic reed switch 12 being in a vertical plane closely adjacent the path of orbital rotation of the magnet 15 will be closed and opened by the sweep of the magnet past the switch such as from A to B (FIG. 2) during every revolution of the wheel.

Since the circuitry (FIG. 5) to one of the microammeters is typical of those to the others, all of which are indicated generally at 20, 21, 22 and 23 in FIG. 4, a description of one will suffice for all.

One side of voltage source 30 is connected by wire 31 to one side of a variable resistor 32 and by wire 33 to one side of a fixed resistor 34, then by wire 35 to one side of a capacitor 42 and to one side of the magnetic reed switch 12 and to the anode of diode 36 and then connected by wire 60 from the cathode of diode 36 to one side of a capacitor 43 and to one side of a fixed resistor 37. The other sides of capacitor 42, reed switch 12, capacitor 43 and resistor 37 are connected by wire 38 to the ground connection 39. One side of each of the microammeters 1, 2, 3, and 4 is connected by wire 60 to the positive side of capacitor 43. The other side of each microammeter is connected by wire 61 to a junction 62 of all four circuits in FIG. 4 which are identical with the one just described and as illustrated in FIG. 5. The capacitor 44 is connected in parallel with the microammeters to smooth out pulses.

Each individual circuit, as aforesaid, consists of the resistors 32, 34, and 37, capacitors 42—43, magnetic reed switch 12, magnet 15, and diode 36, all of which, in combination, function as a tachometer for its respective vehicle wheel. When all four circuits are interconnected through their respective microammeters, as shown in FIG. 4, each circuit will function individually to indicate the rotational speed of its respective wheel relative to the others. The charging time of said capacitors in each circuit and energization of the microammeters are variable through the medium of the tachometer function in accordance with the speed of rotation of their respective wheels.

With reference to FIGS. 6 and 7 and assuming, for example, that the circumference of the properly inflated tire 50 is 62 inches and that of the under-inflated tire is 59 inches, it follows that because of the resultant shorter hub-to-ground tire radius of wheel 5A, that wheel must rotate at a greater speed than wheel 5 of tire 50 to make up the 3-inch circumferential difference at any given speed of the vehicle.

The function of each typical circuit (FIG. 5) is to give a measure of the speed of rotation of the wheel to which it is connected. To accomplish this each circuit developes a voltage across capacitor 43 which will be proportionate to the time interval per revolution of its respective wheel. During one revolution of a particular wheel the capacitors 42—43 are charged through the resistors 32 and 34 from the voltage source 30. The time constant of resistors 32 and 34 and capacitors 42—43 is long compared to the time interval per revolution of the wheel and the charging curve of the capacitors will be relatively linear. During each revolution of the wheel the magnet 15 will sweep past the magnetic reed switch 12 and momentarily close the switch 12 and thus discharge capacitor 42 to zero voltage, or ground. Because of diode 36 the capacitor 43 cannot discharge when the reed switch 12 is closed and therefore the peak voltage (FIG. 5A) reached during each revolution will be retained across capacitor 43. The faster the wheel rotates the lower the retained voltage will be, and vice versa. The time constant of capacitor 43 and resistor 37 is long compared to the time interval per revolution of the wheel so that the voltage across capacitor 43 will be relatively steady.

The voltages developed across all four capacitors are then compared by connecting them through their respective microammeters to a common point 62 by wires 61.

Resistor 32 is variable to allow for initial zero adjustment of the four microammeters.

Referring particularly to FIG. 7 with the under-inflated tire 51 on wheel 5A, and assuming that the other vehicle tires are properly inflated as typified in FIG. 6, then at a given vehicle speed the under-inflated tire 51 on wheel 5A will rotate at a greater speed than the other tires and wheels for the reasons above pointed out. The voltage attained across capacitor 43 in the circuit connected to wheel 5A will therefore be lower than the voltages attained across the capacitor 43 of the circuits connected to the three properly inflated tires as in FIG. 6. Current flow through the microammeter of the circuit connected to wheel 5A will therefore be in the opposite direction to the flow through the microammeters of the three other circuits.

Accordingly, magnet 15 on wheel 5A will sweep past its respective reed switch 12 (FIG. 2) at a greater speed than the sweep of the magnet on wheel 5 past its related reed switch.

Since, as above pointed out, the invention comprehends converting the rotational speed of each wheel into a suitable signal which will be proportional to the wheel speed and therefore the air pressure of its tire, it will be understood that for a given vehicle speed the effective hub-to-ground radius of each wheel will be proportional to the air pressure of its respective tire and that the rotational speed of the wheel will vary inversely with the air pressure in the tire.

In order to maintain equal sensitivity at different vehicle speeds, the voltages attained across capacitors 43 should reach the same peak value regardless of vehicle speed. This can be accomplished by having the voltage source 30 increase proportionally with greater vehicle speed, or by increasing the charging rates by proportional equal amounts of the capacitor 42 in each of the four circuits as vehicle speed increases.

In operation, the capacitor 43 will be charged by the sawtooth signal passing through the diode 36 and retain the peak voltage reached even when the voltage across signal on capacitor 42 drops to zero when magnetic reed switch 12 closes. The time constant of capacitor 43 (resistance 37) is long relative to the repetition rate of the sawtooth signal. The voltage across capacitor 43 is steady and its value will almost equal the peak value of the sawtooth signal. Thus, as the rotational wheel speed of partially deflated tire 51 increases the sawtooth voltage peak will decrease as will the final voltage across capacitor 43. During the short time magnetic reed switch 12 is closed during each revolution of its respective wheel, capacitor 42 is charged through resistances 32 and 34, and discharged to zero during the time that the switch is closed. As soon as the switch opens then 42 is recharged. The long time constant of the resistances 32 and 34 and capacitor 42 compared to the time for one revolution of the wheel is such that the charging curve (voltage) of 42 will be of nearly a straight line as at D in FIG. 5A.

In the pattern shown in FIG. 5A let it be assumed that the full line span A indicates the time for one revolution of any one of the fully inflated vehicle wheels, such as 5 in FIG. 6. The line span B indicates the time for one revolution of a partially deflated tire and wheel such as 5A in FIG. 7. As the tire radius of any one of the wheels decreases because of deflation, as above pointed out, and the rotational speed of that wheel increases, the charging time of capacitor 42 will be decreased and the peak voltage attained across capacitor 42 will also be decreased.

This invention also comprehends the inclusion of four additional diodes (not shown) which could be connected one each in parallel across each microammeter so that current flow in only one direction, corresponding to a condition of tire under-inflation, would register on the microammeters.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

I claim:

1. Air pressure indicating means for tires of the wheels of a vehicle wherein the rotational travel speed of an under-inflated tire will be greater than that of a fully inflated tire, comprising in combination:

magnetic means carried by and rotatable with each of said wheels;

magnetically actuated switch means associated with each of said wheels and in circuit with a source of electric current;

each of said switch means fixedly mounted to the vehicle adjacent the plane of orbital rotation of the magnet of their respective wheel;

electrically actuated microammeters within the vehicle each in independent circuit with said current source and with said switch means; and each of said independent circuits including electrically interconnected resistors, capacitors and a diode all in electrical circuit with said microammeters whereby energization of said microammeters will vary in accordance with the speed of rotation of their respective wheels and whereby the inflated condition of all of said tires will be indicated by the energization of the microammeters in circuit with the respective switch means of those wheels.

2. Air pressure indicating means as claimed in claim 1 wherein said switch means are of the reed type.

3. Air pressure indicating means as claimed in claim 1 wherein said independent circuits also have connected therein a variable resistance for initial zero adjustment of their respective microammeters.

4. Air pressure indicating means as claimed in claim 1 wherein each of said independent circuits has connected therein a rectifier smoothing discharge current from one of said capacitors.